July 30, 1968  E. C. HOPKINS ET AL  3,395,006
APPARATUS FOR MAKING FIBER ENERGY-CONDUCTING DEVICES
Filed Oct. 30, 1963  3 Sheets-Sheet 1
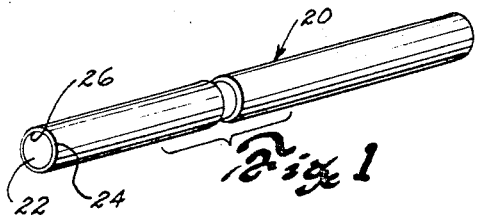
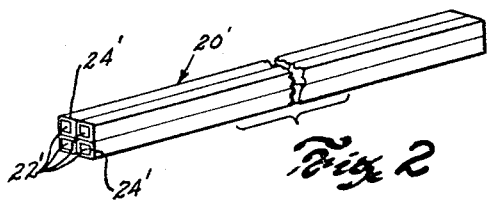
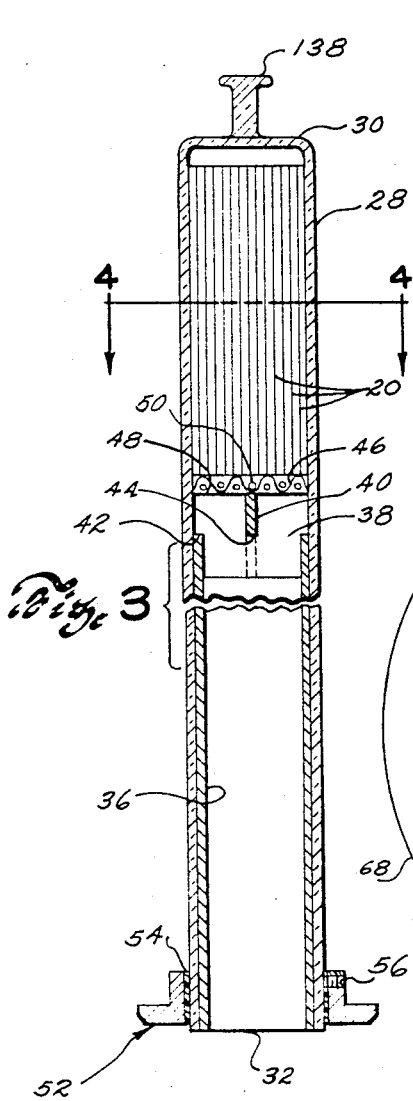
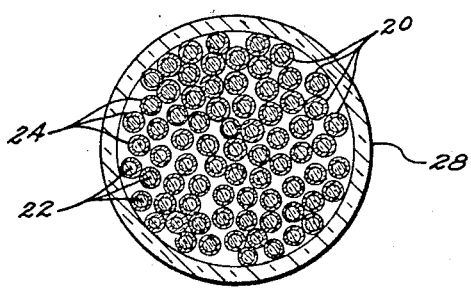
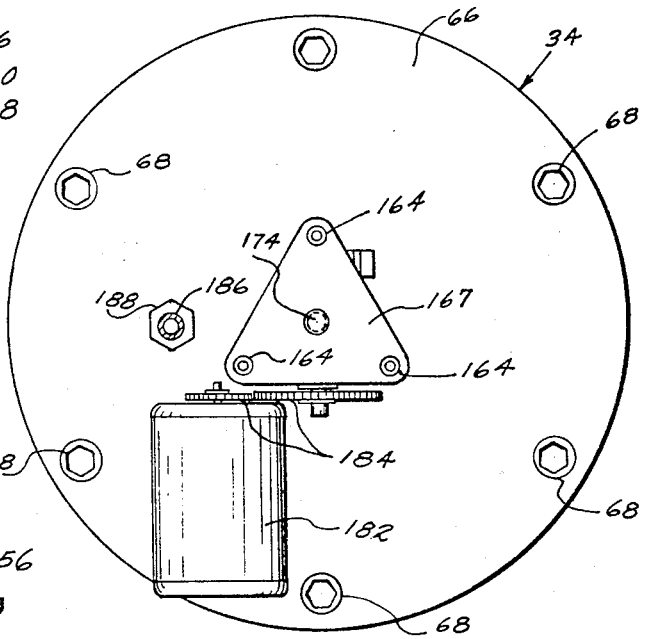
INVENTOR
ETHAN C. HOPKINS
HENRY B. COLE
BY
ATTORNEY

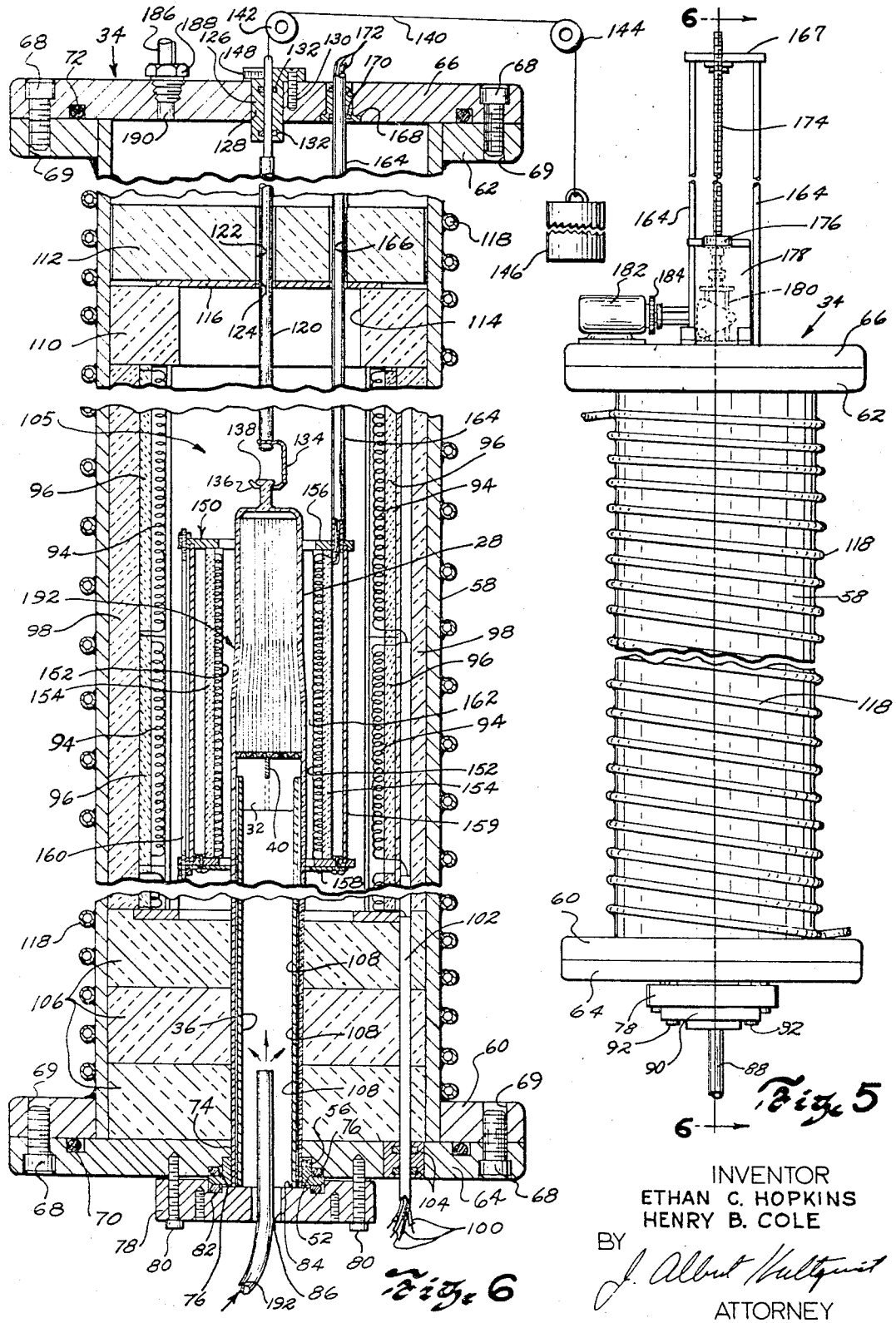

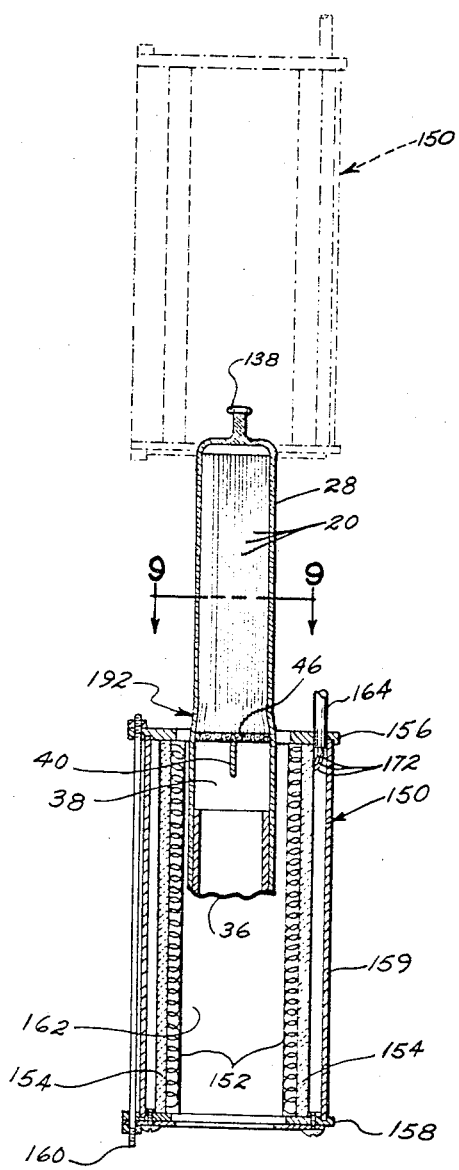
Fig 8
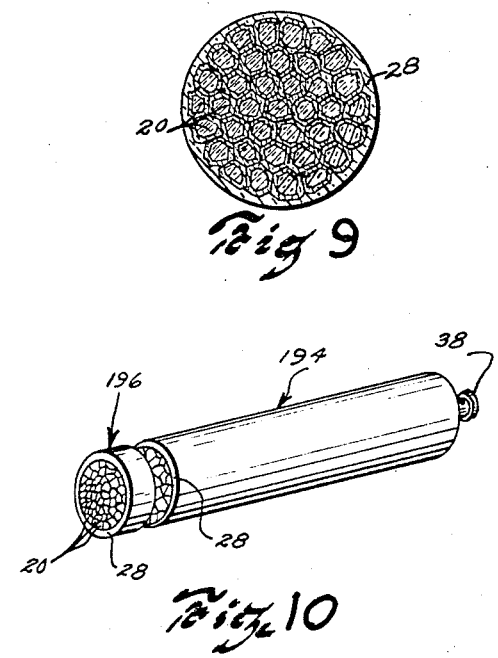
Fig 9
Fig 10
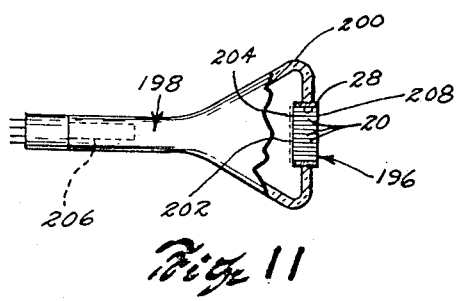
Fig 11
INVEVTOR
ETHAN C. HOPKINS
HENRY B. COLE
BY
*J. Albert Kultquist*
ATTORNEY & # United States Patent Office 3,395,006
Patented July 30, 1968

3,395,006
APPARATUS FOR MAKING FIBER ENERGY-CONDUCTING DEVICES
Ethan C. Hopkins, South Woodstock, and Henry B. Cole, East Woodstock, Conn., assignors, by mesne assignments, to American Optical Company, Southbridge, Mass., a corporation of Delaware
Filed Oct. 30, 1963, Ser. No. 320,197
2 Claims. (Cl. 65—12)

This invention relates to devices having energy-receiving and emitting opposite end faces and formed of a multiplicity of fused energy-conducting fiber elements extending from one face toward the other. The invention has particular reference to novel and improved apparatus and to a method for making the same.

In the fabrication of energy-conducting devices which are formed of fused bundles of relatively long and thin energy-conducting fibers, there is the problem of achieving clean and uninterrupted interfacial fusion between each and every fiber of the bundle especially when a great number of very thin fibers are required to be hermetically fused together in side-by-side relation with each other. Imperfections such as separations between respective fibers or entrapped gasses and foreign matter or the like between said fibers may render the assembly of fibers or certain sections thereof pervious to air or gasses. Thus, the assemblies or cross sectional slices removed therefrom are not suitable for use as energy-conducting components of the face plate type destined for use in the external wall or envelope of evacuated electron tubes or devices of a similar nature. Furthermore, in fusing bundles of optical fibers embodying glass core and cladding parts, it is important that the fibers retain a substantially uniform core-to-cladding thickness ratios throughout their lengths. Entrapment of foreign matter or gases between respective fibers of such bundles causes distortion and thinning of the fiber claddings or of the fibers as a whole and may even cause the occurrence of discontinuities in certain fibers. Imperfections of this nature are adverse to the light-conducting properties of the affected fibers and render the resultant fused structure optically inferior.

Accordingly, a primary object of the present invention is to overcome the problems encountered heretofore in fusing bundles of energy-conducting fibers and to provide for the making of improved fiber energy-conducting devices of the fused type.

Another object is to provide novel means and method for forming a hermetically sealed fused bundle of a multiplicity of energy-conducting fibers and to provide for such control of the fiber environment and contact pressure at the interfacial fusing area between respective fibers as to effect uninterrupted clean fusion along substantially the entire lengths of respective adjoining fibers of the bundle.

Another object is to provide for the fusing of an elongated bundle of energy-conducting fibers progressively from one end toward the other end thereof; and to provide for progressive compression of the fibers and extrusion of air and gases therebetween during such fusion.

A further object is to provide for control of the length of the fiber bundle during fusion thereof and still another object is to provide novel and improved apparatus for practicing the process of the invention in a simple, efficient and economical manner.

To attain the aforesaid objects and others which may appear from the following detailed description in accordance with the principles of the invention, fibers to be fused together are assembled in bundled side-by-side relation and placed longitudinally within a tube of heat-softenable material. The assembly of the tube and fibers is positioned within apparatus constructed and arranged to apply fluid pressure around the tube independently of the fiber environment. Oxygen is diffused through interstices between fibers within the tube independently of the tube environment to promote oxidation of undesirable organic matter on the fibers. The tube and fiber assembly is heated to a temperature below the fusing temperature of the fibers but sufficient to effect such oxidation of the organic matter. Following this, the temperature of the tube and fiber assembly is elevated to a point near but still below the fusing temperature of the fibers to cause expulsion of adsorbed and absorbed moisture and gases from the fibers. A vacuum is drawn within the tube to remove such gases from the fiber environment. Fusion of the fiber optics is then effected progressively from one end of the assembly toward the other end thereof by the provision of traveling heating means in the apparatus. The traveling heating means is so constructed, arranged and operated as to bring increments along the length of the assembly of fibers relatively abruptly to fusing temperature in a relatively short transverse zone and to thereafter hold the fibers at such temperature for a period of time sufficient to assure complete fusion of all fibers throughout the thickness of the assembly. Simultaneously with operation of the traveling heating means, fluid pressure is applied externally to the tube so as to compress the heated assembly of the tube and fibers radially and produce a controlled contact pressure on respective fibers at the interfacial fusing area thereof.

In general, the present invention contemplates the use of special atmospheres and vacuum or a cycling of these parameters within the fiber-containing tube independently of fluid pressure applied from without. Fusion of the fiber-containing tube assembly takes place progressively along the length of the fibers from one end to the other thereof with pressure being applied externally upon the tube to close undesirable interstices between the fibers and to concurrently extrude air and gases therein. Provision is made for control of the length of the assembly during processing thereof.

The invention will be more fully understood by reference to the following detailed description which is accompanied by a drawing in which:

FIG. 1 is a greatly enlarged perspective illustration (broken away intermediate its ends) of an energy-conducting fiber useful in making energy-conducting devices according to the principles of the present invention;

FIG. 2 is an illustration similar to FIG. 1 of a modified energy-conducting fiber;

FIG. 3 is a side view in cross section of an elongated tubular member containing a multiplicity of energy-conducting fibers to be fused together in accordance with the principles of this invention, the tubular member being provided with fittings for supporting respective fibers therein and for adapting the illustrated assembly as a whole to apparatus for carrying out the process of the invention;

FIG. 4 is an enlarged transverse cross-sectional view taken approximately along line 4—4 of FIG. 3;

FIG. 5 is a side elevational view of an embodiment of the apparatus of the invention;

FIG. 6 is an enlarged longitudinal cross-sectional view of the apparatus taken along line 6—6 of FIG. 5 with intermediate portions thereof broken away;

FIG. 7 is an enlarged plan view of the apparatus illustrated in FIGS. 5 and 6;

FIG. 8 is a fragmentary longitudinal view (in cross-section) of a fused energy-conducting structure formed in accordance with the principles of the present invention along with which is illustrated in one position by longitudinal cross-section and in another position by dot-dash outline, a component of the apparatus of FIGS. 5-7 used to effect fusion of the structure;

FIG. 9 is an enlarged cross-sectional view taken approximately on line 9—9 of FIG. 8;

FIG. 10 is a perspective illustration of a portion of the fused energy-conducting structure shown in FIG. 9 with a section removed therefrom; and FIG. 11 is a side view partially broken away of an electron tube illustrating use of a fiber energy-conducting structure formed in accordance with the principles of the present invention.

The present invention contemplates the making of energy-conducting structures having mosaic energy-receiving and energy-emitting faces at opposite ends thereof formed of a multiplicity of relatively long and thin energy-conducting guides lying in side-by-side relationship and extending from one face of the structure toward the other. Each is fused along substantially its complete length to adjoining guides and corresponding opposite ends of the guides from the energy-receiving and emitting faces.

Referring more particularly to the drawing, it will be seen that, in accordance with one aspect of the invention, such energy-conducting structures are formed of a multiplicity of optical fibers which, as individual light guides, each function independently of the other to receive and conduct light from one face of the composite structure to the other. One such fiber 20 is illustrated in FIG. 1 and comprises core 22 of light-conducting material having a relatively high index of refraction surrounded by a thin cladding 24 of material of relatively low index of refraction. A light-reflecting interface 26 is formed between core 22 and cladding 24. Light which enters one end of the fiber and is incident upon interface 26 at an angle greater than the critical angle of reflection for the interface will be repeatedly reflected in the region of the interface 26 and be conducted through the fiber to its opposite end in accordance with the principles of total internal reflection. Fiber 20 might, for example, embody a core 22 formed of lanthanum flint glass having an index of refraction of approximately 1.81 and a cladding 24 of borosilicate glass having an index of refraction of approximately 1.48. Other core and cladding glasses such as 1.75 index flint and 1.52 index crown or soda lime glasses respectively can be used. For energy in the infrared region, for example, between 800 and 1000 millimicrons, the core material may be arsenic trisulfide glass having an index of refraction of approximately 2.47 and the cladding may be arsenic sulfide glass formed of 50% by weight of arsenic and 50% sulphur having an index of refraction of 2.32.

For purposes of clarity, fibers 20 are illustrated throughout the drawing as being rather large with only a relatively few fibers bundled together to form the fused structure. In practice, however, the fibers may be only a few thousandths of an inch or less in transverse dimension and number in the hundreds of thousands.

When each guide or light passage is required to be as small as only a few microns in transverse dimension, single core fibers 20 of such small sizes become difficult to handle as individual pieces. Accordingly, the present invention further contemplates the use of multifibers in making up the fused structure. That is, each multifiber, as a whole, may be of any desired transverse dimension and, at the same time, contain a number of individual cores surrounded by low refractive index material all fused together. Thus, each multifiber will provide a number of light guides. Multifibers may be formed by grouping a selected number of relatively large single core fibers together in side-by-side relation and heating and drawing the group thereof to a desired reduced cross-sectional size at which time respective fibers of the group become fused to each other.

In FIG. 2, such a multifiber 20' is illustrated. Multifiber 20' embodies a number of light-conducting cores 22' each surrounded by low refractive index cladding material 24'. Each core 22' of multifiber 20' functions as an individual light guide in the manner described above with relation to core 22 of fiber 20. Multifiber 20' is shown, for ease of illustration, as embodying only four cores 22' which are relatively large in cross-section; it being understood that, within the scope of this invention, multifibers having a greater number of cores 22' per unit area may be used. While cores 22' are illustrated as being of rectangular or square cross section other shapes such as round or hexagonal may be used.

In assembling a multiplicity of fibers which are to be fused in accordance with the principles of this invention, the assembly can be formed of either single core fibers 20 or multifibers 20'. They may also embody glass clad core parts 22 or 22' formed of suitable electrical conducting metallic materials such as steel or amalgams (not shown) rather than the light-conducting materials mentioned hereinabove when it is desired to form a fused electrical conducting structure. The fibers may also be tubular in form without core parts 22 or 22' or with central openings extending through said core parts.

In illustrating the principles of the present invention, single core optical fibers 20 are shown in FIGS. 3-10. A number of fibers 20 are cut to substantially equal lengths and placed longitudinally within a long tube 28 formed, for example, of a borosilicate glass (see FIGS. 3 and 4). Fibers 20 are bundled in parallel side-by-side relationship within tube 28 in such quantity as to substantially fill the tube lumen throughout its transverse dimension. Corresponding opposite ends of fibers 20 are arranged to be in approximately flush relation with each other. (See FIG. 4.)

Tube 28 is provided with closed end 30 adjacent which, one end of the bundle of fibers 20 is positioned. As shown in FIGS. 3, 6 and 8, fibers 20 are of a length considerably less than the length of tube 28 so that, when positioned in tube 28, they will extend from adjacent end 30 of tube 28 a distance which is presently preferred to be less than one half of the length of tube 28. In this way and for reasons which will become readily apparent hereinafter, the opposite open end 32 of tube 28 and portions adjacent thereto can be positioned out of the high temperature zone used to fuse fibers 20 together.

As best illustrated in FIG. 6, tube 28 containing the bundle of fibers 20 to be fused is supported vertically in furnace 34 with its end 32 depending. In order to contain the bundle of fibers in the uppermost end of tube 28 and, at the same time, prevent appreciable collapse of the unfilled lower section of tube 28 during subsequent heating thereof, a rigid supporting tube 36 is placed within the lumen of glass tube 28 so as to extend from end 38 thereof to a point adjacent the depending ends of fibers 20 (see FIG. 3). Tube 36 is preferably formed of stainless steel or material of a similar nature having a softening temperature considerably above the highest temperature used in the process of the invention. A pair of interfitted cross members 38 and 40 are positioned upon the uppermost end of supporting tube 36. Members 38 and 40 are shouldered at 42 and 44 respectively (see FIG. 3) so as to extend into tube 36 and seat edgewise upon its uppermost end. At the same time, they are constructed and arranged to interfit with one another and be disposed in right angular relation to each other diametrically across the uppermost end of supporting tube 36. Respective upper and lower edges of members 38 and 40 are in substantially flush relation with each other. Screen 46 formed of stainless steel wire or the like rests upon upper edges 48 and 50 of cross members 38 and 40 and provides means for preventing downward displacement of fibers 20 in tube 28. The mesh size of screen 46 is smaller than the transverse dimension of individual fibers 20. Foramina in screen 46 render it possible to cause gases or special atmospheres injected into tube 36 to diffuse through or be withdrawn from interstices between fibers 20 in accordance with the principles of the invention as will be set forth in greater detail hereinafter.

In order to mount the above described assembly in furnace 34, a flanged annular fitting 52 is secured to tube 28 adjacent its depending open end 32. Fitting 52 is secured in place on tube 28 with a suitable sealing medium 54 such as an epoxy resin and set screws 56 (see FIG. 3). Sealing medium 54 provides a pressure-tight seal between tube 28 and fitting 52 while screws 56 function to hold the pre-set epoxy from running out. An O-ring seal can be used in place of the epoxy if desired.

Referring more particularly to constructional details of furnace 34, it can be seen in FIGS. 5, 6 and 7 that the main supporting structure of the furnace comprises tubular column 58 having annular collars 60 and 62 welded or otherwise fixed to respective opposite ends thereof. Covers 64 and 66 provide removable closure means for opposite ends of column 58 and are secured to collars 60 and 62 respectively by cap screws 68 which engage threaded openings 69 provided in collars 60 and 62. Since the interior of furnace 34 is required to be subjected to relatively high gas pressure, covers 64 and 66 are provided with conventional O-ring gaskets 70 and 72 respectively to render their connections with collars 60 and 62 pressure tight.

Cover 64 is provided with an axial opening 74 through which tube 28 is extended (see FIG. 6). Shoulder 76 in opening 74 receives the flanged portion of fitting 52 on tube 28 together with O-ring gasket 76 which renders the connection between cover 64 and fitting 52 pressure tight.

Fitting 52 is clamped to end cover 64 by mounting plate 78 which, in turn, is secured to end cover 64 with screws 80. Screws 80 thread into openings 81 provided in cover 64. A conventional O-ring gasket 82 in plate 78 engages the under side of fitting 52. This renders the connection between fitting 52 and plate 78 vacuum tight so that a vacuum can be drawn internally of tube 28. As it can be seen in FIG. 6, the depending end of supporting tube 36 rests upon upper surface 84 of mounting plate 78 so as to prevent downward displacement of the bundle of fibers 20 in tube 28. Mounting plate 78 is provided with a centrally disposed opening 86 which communicates with the interior of tube 28. Thus, a gas line or hose can be inserted through opening 86 into tube 28 to inject gases or special atmospheres thereinto for diffusion upwardly through screen 46 and into the fiber 20 environment during practice of the process of the invention as will be described in greater detail hereinafter. When it is desired to withdraw air and gases from within tube 28, vacuum line 88 having plate-like adaptor 90 at one end thereof (see FIG. 5) is attached to plate 78 with screws 92 which are adapted to be threaded into plate 78. In this way, vacuum line 88 is positioned so as to communicate with opening 86 through which air and gases in tube 28 are withdrawn.

Internally of tubular column 58, electrical heating coils 94 (see FIG. 6) are supported in blocks 96 of refractory material. Blocks 96 are, in turn, insulated from tubular column 58 by a layer of conventional fibrous ceramic heat-insulating material or the like 98. Although blocks 96 containing heating coils 94 are shown only in cross-section in FIG. 6 for clearness of illustration they are, in practice, so arranged as to completely encircle tube 28 in which fibers 20 are supported. Heating coils 94 are electrically connected for operation to a source of current (not shown) by leads 100 which extend through conduit 102. Gaskets 104 in end cover 64 provide a pressure tight seal around conduit 102. Heating coils 94 are arranged to extend throughout the major portion of the length of furnace 34 intermediate its opposite ends to provide a relatively long cylindrical heating chamber 105 within furnace 34. Between end cover 64 and heating coils 94, however, a substantial thickness of heat-insulating material is provided to shield the depending end of tube 28 from high temperatures produced in heating chamber 105. In a presently preferred arrangement, blocks 106 of fibrous ceramic heat-insulating material are held in place by end cover 64 and are stacked, one upon the other, to provide the required thickness of heat insulation. Heat insulating blocks 106 are provided with central openings 108 aligned coaxially with each other and through which tube 28 containing fibers 20 is extended upwardly into heating chamber 105. Openings 108 in insulating blocks 106 are of such a transverse dimension and shape as to provide a close fit around tube 28. By so insulating the lowermost section of tube 28 from high temperatures produced in chamber 105, the seal provided by medium 54 between tube 28 and fitting 52 is kept intact during the process of the invention. O-ring gaskets 70, 76 and 82 are likewise protected from damaging temperatures so that gas under pressure within chamber 105 of furnace 34 is prevented from entering tube 28. Also, with such construction, the introduction of special atmospheres into tube 28 or evacuation of the interior of the tube can be accomplished independently of pressure applied externally to tube 28. With tube 28 fully extended into furnace 34 as illustrated in FIG. 6, the uppermost section thereof which contains fibers 20 is disposed approximately centrally between opposite ends of heating chamber 105.

Above heating chamber 105 are blocks 110 and 112 formed of conventional fibrous ceramic heat insulating material. Block 110 having a central opening 114 of approximately the full diametrical dimension of heating chamber 105 is seated upon the uppermost ends of insulation 98 and refractory blocks 96. Heat insulating block 112, in turn together with a plate-like metallic spacer member 116, normally rests upon the uppermost end of heat insulating block 110. Member 116 is provided to support the intermediate portion of block 112 which provides a heat insulating barrier between heating chamber 105 and the uppermost end of column 58 of furnace 34. In this way O-ring gasket 72 and other pressure-tight sealing members in cover 66 which will be described in detail hereinafter are protected from damaging high temperatures produced in heating chamber 105. Insulating block 112 can be moved relatively freely upwardly in column 58 for removal thereof from furnace 34 when cover 66 is removed from collar 62.

In order to prevent tubular column 58 and the exterior of furnace 34 in general from becoming excessively heated by penetration of heat through the above described heat insulating members 98, 106, 110 and 112, tube 118 is coiled around tubular column 58 and preferably brazed, soldered or otherwise secured thereto. The helix of tube 118 extends throughout substantially the major portion of the length of column 58 (see FIGS. 5 and 6) and a fluid coolant such as water is circulated through tube 118 by means of a fluid circulating pump or the like (not shown) during the operation of furnace 34.

Since, when heated to softening temperature, the assemly of glass tube 28 and fibers 20 will have a tendency to slump and become distorted, particularly throughout its uppermost section which is unsupported by tube 36, means is provided in furnace 34 to apply a positive upwardly directed holding force or tension on tube 28. This means (see FIG. 6) comprises a vertically disposed rod 120 extending into heating chamber 105 through cover 66, heat insulating block 112 and spacer member 116. Openings 122 and 124 are provided in block 112 and spacer member 116 respectively to loosely receive rod 120. The uppermost end of rod 120 is supported for longitudinal sliding movement in a fitting 126 which, in turn, extends through opening 128 in cover 66. Fitting 126 and opening 128 are so machined as to provide fitting 126 with a pressure tight connection in cover 66 and one or more screws 130 hold fitting 126 in place. Annular gaskets 132 are provided within fitting 126 so as encircle and compressively engage the rod 120 thereby to provide a pressure tight seal around rod 120 while still permitting it to be freely moved longitudinally in fitting 126.

Attached to the depending end of rod 120 is forked adaptor 134, the tines 136 of which are arranged to fit beneath button 138 provided upon the uppermost end of tube 28. In a presently preferred arrangement, button 138 is formed of glass and is fused to tube 28 as illustrated in FIGS. 3 and 6. Tension is applied to tube 28 by pulling upwardly on rod 120 with any suitable means such as, for example, the wire, pulley and weight arrangement shown in FIG. 6. In this arrangement, wire 140 having one end attached to the uppermost end of rod 120 is extended over pulleys 142 and 144. Weight 146 is secured to the opposite end of wire 140 and is chosen to be of such weight as to provide the desired tension on tube 28 when rod 120 is unrestrained against longitudinal movement in fitting 126. When it is desired to hold the tube 28 and fiber 20 assembly against bending without appreciable change of length thereof, set screw 148 is locked against rod 120. A longitudinal pulling force sufficient to draw and attenuate the tube 28 and fiber 20 assembly during processing thereof can be applied to rod 120 by releasing screw 148 and applying the required amount of weight to the free end of wire 140. Alternatively the free end of wire 140 can be attached to a motor driven winding drum or the like (not shown) to replace weight 146 and thereby effect drawing of the tube 28 and fibers 20 assembly.

As mentioned hereinabove, tube 28 and fibers 20 are first heated to controlled temperatures below the fusing temperature of glasses thereof for the purpose of conditioning the fibers for subsequent fusion. Heating coils 94 are used for this purpose. During subsequent fusion of fibers 20, however, a more intense heat is used and it is applied to the portion of tube 28 containing fibers 20 progressively from one end toward the other end thereof. This is accomplished by the provision of a cylindrical traveling heater 150 (see FIGS. 6 and 8) disposed within heating chamber 105. Heater 150 is arranged for movement longitudinally in chamber 105 from a position adjacent the uppermost end of chamber 105 to a position adjacent the opposite lowermost end thereof.

Heater 150 (see FIGS. 6 and 8) comprises electrical heating coils 152 supported in blocks 154 of refractory material which are, in turn, clamped between annular end plates 156 and 158. Heating coils 152 and their supporting blocks 154 are enclosed by a relatively thin encircling side cover 159 formed of sheet metal or the like and the entire assembly is held together with a number of tie rods 160, one of which is shown in each of FIGS. 6 and 8. The above-described components of heater 150 are formed of materials capable of withstanding, without appreciable distortion thereof, the relatively high temperature required for glass fusing operations.

While heating coils 152 and their respective supporting blocks are shown only a cross-section they are, in practice, arranged to form the cylindrical enclosure of heating chamber 162. Chamber 162 is adapted to freely receive tube 28 longitudinally therein with substantial clearance when heater 150 is lowered over tube 28.

Heater 150 is suspended within heating chamber 105 in approximately coaxial relation with tube 28 by hollow rods 164 each having one end thereof extending through plate 156. Rods 164 are brazed, threaded or otherwise fixedly secured to plate 156. In the embodiment illustrated (see FIGS. 5, 6 and 7) three such rods 164 are provided and each extend upwardly through insulating block 112 and cover 66. Outwardly of furnace 34, opposite ends of respective rods 164 are secured to triangular plate 167 which holds rods 164 in fixed parallel spaced relation with each other. Clearance openings 166 in insulating block 112 and bushings 168 in cover 66 (one of each of which is shown in FIG. 6) are provided to receive rods 164. Bushings 168 in cover 66 embody annular gaskets 170 which compressively engage rods 164 to provide a pressure tight seal around respective rods 164 while permitting freedom of longitudinal movement thereof through bushings 168 in cover 66.

Electrical heating coils 152 in heater 150 are connected for operation to a source of electrical current (not shown) by leads 172 which are extended through one or more of the hollow rods 164. Openings in rods 164 are sealed by means (not shown) so as to prevent escape of compressed air or gases used to create fluid pressure internally of furnace 34.

Heater 150 is raised and lowered in chamber 105 of furnace 34 by actuation of lead screw 174 (see FIGS. 5 and 7) which is threadedly engaged in plate 168. The depending end of lead screw 174 is journaled in a bearing 176 carried by braket 178 fixedly mounted on cover 66. Right angular drive means 180 powered by a conventional reversible electric motor 182 through gearing 184 (see FIGS. 5 and 7) functions to actuate lead screw 174. Thus, rotation of lead screw 174 in one direction will cause lowering of heater 150 while an opposite rotation of lead screw 174 will lift heater 150 in furnace 34.

In accordance with the principles of this invention, the bundle of fibers 20 in tube 28 is heated to fusing temperature progressively from one end toward the other thereof and held at this temperature for a period of time sufficient to effect complete fusion of all fibers throughout the thickness of the bundle. Since the bundle of fibers is normally of substantial thickness having, for example, a diametral dimension of from one to one and a half inches or greater, the outermost fibers 20 of the bundle inherently become heated to fusing temperature prior to the more centrally disposed fibers. Thus, in order to provide for complete penetration of heat of fusing temperature to the innermost fibers of the bundle and to minimize temperature gradients in the fusing zone so as to assure complete fusion of all fibers throughout the thickness of the bundle, heating chamber 162 of heater 150 is designed to be of such length and is lowered over the portion of tube 28 containing fibers 20 at such a rate as to cause the bundle of fibers 20 to become substantially uniformly heated to at least minimum fusing temperature throughout all cross-sectional areas thereof prior to emergence of said areas from heater 150. It has been found that, for a fiber bundle which is approximately one and a half inches in diameter best results will be obtained by using a heater 150 having a heating chamber 162 of approximately eight inches in length and lowered at a rate of approximately one third of an inch per minute. It is to be understood that, in practice, the bundle of fibers is preheated to a temperature of only a few hundred degrees lower than the actual fusing temperature by heating coils 94 in chamber 105 prior to being subjected to the relatively high fusing temperature produced in chamber 162 of heater 150. This will be explained in greater detail in a description of the process of the invention which follows.

Chamber 105 in furnace 34 being pressure tight or hermetically sealed as described above will, consequently, support a vacuum. In accordance with one aspect of the invention, a vacuum is created in chamber 105 during one phase of the process and in a subsequent phase of the process, chamber 105 is pressurized. For accomplishing this, an air line 186 is connected to cover 66 by fitting 188 so as to communicate with opening 190 which extends through cover 66 into the interior of furnace 34 (see FIG. 6). Air line 186 can be connected selectively to a source of compressed air (not shown) for pressurizing chamber 105 or to a vacuum pump or system (not shown) for purposes of evacuating chamber 105. It is to be understood that a second similar air line, fitting and opening can be provided on cover 66 if it is desired to make permanent connections of one air line to a source of compressed air and another air line to a vacuum system. In such a case, a shut-off valve would be provided in each line so that one valve can be closed while the other is open to communication with the interior of furnace 34. Also, the air line 186 and/or a second similar air line can be arranged to communicate with chamber 105 through the side of column 58 or through cover 64 rather than through cover 66 as illustrated if it is so desired.

In practicing the process of the invention, fibers 20 are cleansed as thoroughly as possible prior to or after being placed in tube 28 by rinsing the same with a high purity solvent such as ethyl alcohol or the like. This can be accomplished by dipping or soaking the bundle of fibers in the solvent prior to placement thereof in tube 28 and/or by flushing the bundle of fibers with the solvent after placement thereof in tube 28.

Following cleansing and placement of fibers 20 in tube 28, the entire assembly shown in FIG. 3 including supporting tube 36, members 38 and 40, screen 46 and fitting 52 described hereinabove is inserted as a unit upwardly coaxially into furnace 34 through opening 74 in cover 64. Mounting plate 78 is then secured to cover 64 with screws 80 to hold the assembly in place as described hereinabove. With cover 66 and insulating block 112 removed from the upper end of furnace 34, the forked end 134 of rod 120 is hooked beneath button 138 on the uppermost end of tube 28. Wire 140 is, at this time, extended through opening 124 in place 116, opening 112 in insulating block 112 and through fitting 126 in cover 66. Wire 140 is used to guide rod 120 through openings 124 and 122 when plate 116 and block 112 are returned to their effective positions in furnace 34. Cover 66 is then secured in place upon the uppermost end of furnace 34 carrying with it traveling heater 150 and its associated operating mechanism. Wire 140 is again utilized to guide rod 120 into and through fitting 126 without releasing adaptor 134 from button 138. Once cover 66 is in place, wire 140 is extended over pulleys 142 and 144 and weight 146 functions to apply the above mentioned upwardly directed tension on rod 120.

Processing of the fiber and tube assembly is initiated with heater 150 being positioned in chamber 105 above the uppermost end of the assembly as indicated by dot-dash outline in FIG. 8.

In processing the fiber and tube asembly in accordance with the principles of the invention, the temperatures used, duration of heating cycles, pressures and various other factors are selected in accordance with the diametral size of the assembly and heat softening characteristics of the glass materials of the fiber and tube components of the assembly.

As a criterion for the above, the following illustrations will relate more particularly to the processing of an assembly having an overall diametral dimension of approximately one and one half inches and formed of an outer supporting tube 28 of borosilicate glass having a Littleton softening point of approximately 1450° F. with fibers 20 therein having core parts 22 of approximately 1.81 index lanthanum flint glass having a Littleton softening point of approximately 1270° F. and claddings 24 of approximately 1.48 index borosilicate glass having a Littleton softening point of approximately 1310° F. The fiber 20 and tube 28 glasses are selected so as to have substantially the same or otherwise compatible coefficients of thermal expansion.

With no pressure differential internally and externally of tube 28, the fiber and tube assembly is heated by operation of heating coils 94 to a temperature of from approximately 800° F. to 900° F. for a period of time of from one half to one hour to oxidize combustible dust particles or other organic residues on the fibers 20. In order to enhance oxidation of such organic matter, oxygen is fed into tube 28 during the heating cycle by insertion of a supply line or hose 192 (see FIG. 6) into tube 28 through opening 86. Upon issuing from hose 192, oxygen will diffuse upwardly through foramina in screen 46 and into interstices between fibers 20.

Upon completion of the foregoing cycle, adsorbed and absorbed moisture and gases are caused to be driven from the glasses of fibers 20 and tube 28. This is accomplished by increasing the temperature in chamber 105 to just below the fusing temperature of the fiber glasses or within the range of from 1080° F. to 1100 F. for a period of approximately three hours. During this time, a vacuum is drawn in tube 28 to remove residual gases. In order to create the vacuum in tube 28, hose 192 is removed and vacuum line 88 is placed in communication with opening 86 by attachment of adaptor 90 (see FIG. 5) to mounting plate 78.

At such an elevated temperature, tube 28 being in a softened condition will normally have a tendency to collapse as a result of the pressure differential thereon caused by the inner vacuum. However, such a pressure differential in the present case is neutralized by drawing, in chamber 105, a vacuum which is approximately equal in force to that created within tube 28. Air line 186 is utilized for this purpose in the manner described hereinabove.

By so eliminating differential pressure on tube 28 the tendency for collapsing of tube 28 and closure of interstices betwen fibers 20 is avoided thereby rendering the vacuum in tube 28 highly effective in withdrawing undesirable gases from between fibers 20.

As it is well known, glasses will liberate undesirable gases when heated to their fusing temperature. Thus, by removal of such gases from fibers 20 by heating the same to a temperature near that required for fusion thereof as described above, the formation of such gases during the subsequent fusing operation is, for the most part, avoided.

Following degassing of fibers 20, the temperature in chamber 105 is reduced by an amount sufficient to stiffen or render tube 28 more vicous so that when a relatively high external pressure is applied to tube 28 during subsequent fusion of fibers therein, as will be described, the tube will resist being collapsed by such pressure until heated relatively abruptly to the fusing temperature of fibers 20 progressively along its length. In this way, the fusing operation is rendered zonal with the transition from the unfused to the compressed and fused portion of the tube and fiber assembly taking place abruptly over a relatively short portion of the length of the assembly and moving progressively along the assembly as illustrated at 192 in FIGS. 6 and 8. As the tube and fiber assembly is progressively compressed, gases therein which may not have been previously removed or which might result from heating the assembly to higher than the above described degassing temperature are squeezed or literally extruded from between the fibers.

In performing the fusing operation, the temperature in heating chamber 162 of traveling heater 150 is raised to the fusing temperature of the fiber 20 glasses (approximately 1360° F. for the above examples of fiber glasses) and heater 150 is lowered slowly over the tube 28 and fiber 20 assembly from its uppermost position in chamber 105 at a rate of approximately three minutes per inch. At the same time an ambient pressure of approximately 235 lbs. per square inch is applied externally to tube 28 and a relatively high vacuum of approximately $1 \times 10^{-3}$ millimeters of mercury is drawn internally of tube 28.

As it can be seen from the above given Littleton softening points of the particular glasses set forth by way of illustration, it is intentional and presently preferred that the material of tube 28 having a slightly higher softening temperature than that of the fiber glasses so that the fiber glasses will be assured of reaching their fusing temperature just prior to or at least at the time of collapse of tube 28 in the transition zone 192. Furthermore, in order to assure complete fusion of all fibers 20 throughout the thickness of the assembly thereof, heater 150 is designed to be of a length sufficient to hold the progressively collapsed or compressed portions of the assembly at their fusing temperature for a period of a few minutes following initial compression and fusion thereof. It is also pointed out that the relatively great pressure differential resulting from outer fluid pressure on tube 28 together with the vacuum therein causes a compressive swaging together of fibers 20 thereby applying high contact pressure to mating surfaces of fibers 20 to assure elimination of interstices therebetween and complete sealing thereof. A cross-section of the resultant fused assembly of tube 28 and fibers 20 is illustrated in FIG. 9.

At all times during the above-described process, the heat softened tube 28 and fiber 20 assembly is supported against appreciable bending or slumping by rod 120. Since, however, a relative change in length of the assembly will result from compacting of the fibers during fusing thereof under pressure, it is preferable to provide a positive upwardly directed tension or slight draw on the assembly. The draw should be of an amount at least sufficient to keep the fibers in parallel alignment with each other. Otherwise, a wrinkling of the fibers will tend to take place. It should be understood that the tube 28 and fiber 20 assembly can be drawn to any reduced cross-sectional size desired by control of the amount of weight applied to the free end of wire 140 or by the application of a motor driven winding drum or the like to wire 140.

When heater 150 has reached a lowered position in chamber 105 beyond the fiber containing portion of tube 28 as shown in FIG. 8, the fused assembly of tube 28 and fibers 20 is annealed in chamber 105. Annealing is accomplished by gradually lowering the temperature in chamber 105 at a rate of approximately one degree per minute from a point slightly above the annealing temperature (1100° F.) of the fiber core glass down to the strain point (approximately 800° F.) of the fiber cladding glass. Thereafter the fused assembly is cooled at any desired rate to a temperature permitting handling thereof and removed from furnace 34.

Upon removal from furnace 34, the fiber containing portion of tube 28 is cut away or otherwise detached from the lowermost portion of tube 28 and the resultant structure 194 (see FIG. 10) can be cut transversely into slabs or plate-like elements having opposite end faces disposed at any desired angle, usually normal to the longitudinal axis of fibers 20. One such plate-like element 196 is illustrated in FIG. 10 and can be employed as an energy conducting face plate for a cathode ray tube or other similar electron device which requires that the face plate be vacuum tight.

In providing a cathode ray tube with such a face plate, the outer surrounding portion of tube 28 on plate-like element 196 can be removed by acid etching or grinding or can be allowed to remain in place and be joined to the cathode ray tube envelope as illustrated in FIG. 11. In FIG. 11 cathode ray tube 198 having envelope 200 is shown for purposes of illustration as having plate-like element 196 vacuum sealed edgewise in envelope 200. Plate-like element 196 is provided with phosphors 202 upon the image-receiving input face 204 thereof so that electron gun 206 can direct an electron beam onto phosphors 202 for exciting the same. This forms a light image on face 204 in conventional manner. The core parts of fibers 20 then receive light from respective segments of the light image and conduct a large part of this light through element 196 for reproducing the light image in mosaic form upon face 208 exteriorly of tube 198. In the embodiment of the invention where electrical energy-conducting fibers are substituted for fibers 20, an electron image formed upon face 204 without phosphors 202 will be similarly reproduced in mosaic form upon face 208.

The present invention is not limited to the use of the glasses given hereinabove by way of example. For some applications it may prove more desirable to use glasses of different indices of refraction and/or softening temperatures and to form structures of cross-sectional sizes larger or smaller than described above. Accordingly, the temperatures, time cycles, pressures and other factors set forth above are exemplary and would, with ordinary skill in the art, be modified to meet the requirements at hand.

We claim:
1. Apparatus for zone fusing, under the influence of high external pressure and internal partial vacuum, an elongated tubular member of glass having a closed one end and opposite open end, and containing a number of glass clad, energy-conducting fibers; said apparatus comprising:

a rigid main furnace body of hollow configuration forming an elongated heating chamber, said furnace body having means adjacent one end thereof for receiving and supporting said tubular member longitudinally substantially centrally within said chamber;

means for hermetically sealing said chamber from the internal environment of said tubular member and from the external environment of said furnace body when said tubular member is received and supported therewithin;

means through which air and gases may be selectively evacuated from said chamber and forced under high pressure thereinto;

means through which air and gases may be selectively directed into and evacuated from said tubular member independently of said chamber;

a cylindrical heating member disposed internally of said chamber and coaxial therewith, said heating member being of greater internal diameter than the external diameter of said tubular member of glass and movable longitudinally in said chamber between opposite ends thereof into encircling relationship with at least a substantial portion of the length of said tubular member of glass; and means for effecting said movement of said heating member to produce zonal heating of said tubular member and fibers contained therewithin progressively along at least said substantial portion of said length thereof.

2. Apparatus as recited in claim 1 further comprising: stationary heating means within said chamber extending along the major portion of the length thereof for effecting desired uniform heating of said tubular member and fibers contained therewithin; and means for applying positive longitudinally directed tension on said tubular member during heating thereof and for drawing the heated combination of said tubular member and fibers to a reduced cross-sectional size.

References Cited

UNITED STATES PATENTS

| | | | |
|---|---|---|---|
| 2,612,726 | 10/1952 | Nordberg | 65—32 |
| 2,640,299 | 6/1953 | Sheard et al. | 65—38 |
| 3,119,678 | 1/1964 | Bazinet. | |
| 3,148,967 | 9/1964 | Hicks | 65—4 |
| 3,224,851 | 12/1965 | Hicks | 65—32 |
| 3,253,896 | 5/1966 | Woodcock et al. | |
| 2,980,957 | 4/1961 | Hicks. | |

DONALL H. SYLVESTER, *Primary Examiner.*

F. W. MIGA, *Assistant Examiner.*